United States Patent Office 3,459,846
Patented Aug. 5, 1969

3,459,846
METHOD AND SPINNERET DEVICE FOR SPIN-
NING TWO-COMPONENT FILAMENTS
Masao Matsui, Takatsuki, Osaka-fu, and Tsuyoshi Naka-
mori, Kobe, Japan, assignors to Kanegafuchi Boseki
Kabushiki Kaisha, Tokyo, Japan, and SNIA Viscosa
Societa Nazionale Industria Applicazioni Viscosa
S.p.A., Milan, Italy
Filed Nov. 15, 1966, Ser. No. 594,467
Claims priority, application Japan, Dec. 1, 1965,
40/74,165
Int. Cl. B32b 31/30
U.S. Cl. 264—171                                        16 Claims

ABSTRACT OF THE DISCLOSURE

Two-component core-and-sheath type filaments in which the core is disposed eccentrically in relation to the sheath are prepared from two kinds of thermoplastic synthetic polymers by simultaneously extruding the two synthetic polymers in laminar flow through a single spinneret thereby forming a filament in which the components extend linearly in side-by-side relation. This two-component filament is extruded into and through a body of one of these polymers and thence in laminar flow through a second spinneret along with a further amount of one of the polymers thereby forming a two-component filament having an eccentrically disposed core of one of these polymers in a sheath of the other polymer.

---

The present invention relates to a method and apparatus for spinning two kinds of thermoplastic synthetic polymers simultaneously through a common spinneret to form a two-component filament wherein these polymers are bonded along the longitudinal axis of the filament in an eccentric core and sheath relation.

It has already been known that a two-component filament wherein two kinds of polymers are eccentrically bonded along the longitudinal axis of the filament, has a latent crimpability. Further, the United States Patent No. 2,987,797 discloses a filament wherein different polymers having poor mutual bondability are bonded in a core and sheath relation and the separation of these polymers is prevented with the subsequent treatments and wherein the core is deviated eccentrically in a high degree, whereby a high degree of potential crimpability is provided. Such highly eccentric core and sheath type two-component filament, that is, a filament wherein the semi-circumference of a sheath portion is extremely thin and a half moon-shaped core portion is positioned in the interior thereof, is advantageous, since it is possible to use as the core portion a filament which itself can hardly be formed into fibre, to increase extremely the latent crimpability. In said United States patent specification there is shown a special spinneret for producing such filaments which is adapted to deviate the shape or arrangement of the core portion by the asymmetrical flow of raw spinning solutions. However, perfect and steady control over the asymmetry or deviation of the flow of raw spinning solutions has various restrictions imposed thereon and the asymmetry of deviation is readily varied by a slight change in condition, so that the cross-section, particularly thin layer portion of the filament obtained by such apparatus is liable to be irregular thus requiring considerable attention to the control over various conditions, and the cross-sectional shape of the core and sheath portions of the filament obtained is not necessarily satisfactory.

An object of the present invention is to provide an improved spinning method and apparatus capable of easily producing a two-component filament of the core and sheath type having a high degree of eccentricity.

Another object is to obtain a two-component filament wherein a highly eccentric core and sheath type of cross-sectional shape provided with a uniform thin layer portion extends continuously along the longitudinal direction of the filament in a high degree of uniformity.

Other objects will become clear as the description proceeds.

The aforesaid objects can be attained by successively carrying out a first step wherein two kinds of separately molten or dissolved thermoplastic polymers are flowed together in a side-by-side relation and a second step wherein a spinning is effected in such a manner that the polymers thus flowed together serve as a core and one of the aforesaid two kinds of thermoplastic polymers serves as a sheath. In the first step, two separately molten or dissolved thermoplastic polymers are fed through two conduits or two chambers separated by a partition respectively to a common guide hole to form layers of polymers having a clear boundary and flowing in a side-by-side relation in said guide hole. The layers formed in the first step are subsequently transferred to the second step while they are still in a molten state, and the layers are extruded together with one of the polymers used in the first step, in a core and sheath relation through a common hole to form a unitary filament. At this time if the layers of polymers are so extruded as to be arranged in the core, in the resulting filament one of the polymers forms the core part which is highly eccentric in the other polymer surrounding completely the core.

The device for effectively carrying out the present method consists in a spinneret wherein an outer spinneret plate provided with one or more spinning holes and an inner spinneret plate provided with guide holes corresponding to said spinning holes are opposed in such a manner that the center axes of the corresponding spinning holes and the guide holes may be positioned respectively on the same straight lines, a reservoir is provided between these two spinneret plates, and means for separately supplying two kinds of molten or dissolved raw spinning solutions to said guide holes and means for feeding one of said kinds of raw spinning liquids to said reservoir are provided.

For a better understanding of the invention, reference is taken to the accompanying drawings, wherein FIG. 1 is an enlarged cross-sectional view of a two-component filament obtained by the method and apparatus of the present invention;

Figure 1:
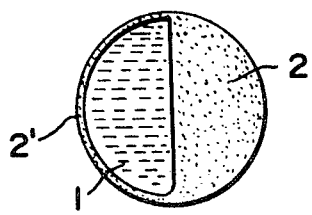

Referring to FIG. 1, 1 denotes a core portion and 2 a sheath. It is desirable that 1 and 2 occupy approximately equal areas and are arranged eccentrically as far as possible. To this end, it is desirable that the core portion 1 is formed into a half moon-shape and a thickness of the thin layer portion 2' in the sheath 2 is small and uniform as far as possible. The half moon-shaped portion, of course, is not necessarily a geometrical semicircle in shape, but the object can be fully attained only if it closely resembles the same.

Figure 2:
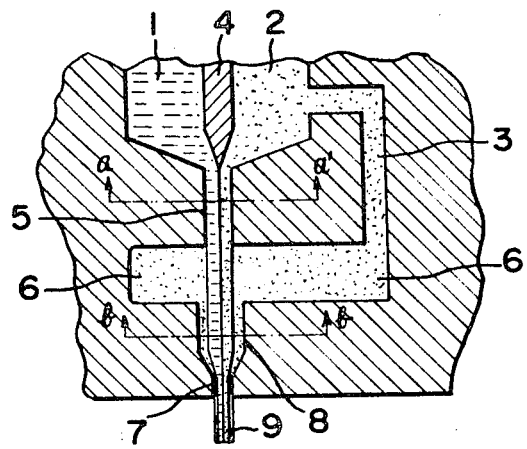
FIG. 2 is a vertical sectional view of the principal portion of the present apparatus.

In FIG. 2, behind the inner spinneret plate there is provided a partition 4 whose lower pointed end is located in the vicinity of the inlet center of a spinning guide hole 5 formed in the inner spinneret plate. The outlet of the spinning guide hole 5 opens to a solution reservoir 6 interposed between the inner and outer spinneret plates. The outer spinneret plate is provided with a spinning hole 7 corresponding to the spinning guide hole 5 and a guide hole 8 communicating therewith, the center axes of said spinning guide hole 5 and spinning hole 7 being aligned with each other. Further, a solution feeding pipe 3 is provided for feeding the raw spinning solution 2 to the solution reservoir 6.

Figures 3, 4:
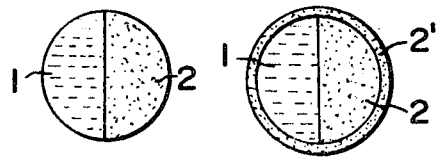
FIGS. 3 and 4 are sectional views taken along lines a–a' and b–b' of FIG. 1, respectively.

In such apparatus, although the two kinds of raw spinning solutions 1 and 2 are separated by the partition 4, they are flowed together at the pointed end of the partition, entered into the spinning guide hole 5 and flowed down therein to form a laminar flow of adjacent type cross-section as shown in FIG. 3, and then they are flowed into the solution reservoir 6 filled with the raw spinning solution 2 fed through a separate solution feeding pipe 3. This stream is further flowed into the guide hole 8 and is then extruded through the spinning hole to produce a filament 9 of core and sheath type cross-sectional shape wherein the outer periphery of the stream is surrounded by the raw spinning solution as shown in FIG. 4. Since the raw spinning liquids 2 and 2' in FIG. 4 are exactly the same material, the cross-section of the produced filament will be such as shown in FIG. 1.

According to the invention, since the component 2' forming the sheath is substantially symmetrical, the thickness of the thin layer portion is uniform and there is little variation in thickness along the longitudinal axis of the filament. Further, it is possible to control the thickness freely.

In order to meet the objects of the present invention it is desirable that the solution reservoir has a larger capacity, since the larger capacity, the better the symmetry and uniformity of the sheath forming component 2'. On the other hand, however, attention should be paid to the fact that if the distance between the inner and outer spinneret plates is too large, the shape of bond sometimes varies before the extrusion depending upon the fluidity, viscosity and surface tension of the two kinds of raw spinning solutions. In order to prevent variation of the bonded shape of the two-component polymers in the guide hole 8 for the spinning hole 7, it is desirable to adjust the diameter and position of the spinning guide hole 5 so that the configurational arrangement of the two components may be similar to the cross-sectional shape or the sheath 2' of the intended filament may be rather thick.

In case of multihole spinning wherein a number of filaments are simultaneously spun through a number of spinning holes, the spinning is effected by the spinning holes arranged on a straight line or curve.

Figure 5:
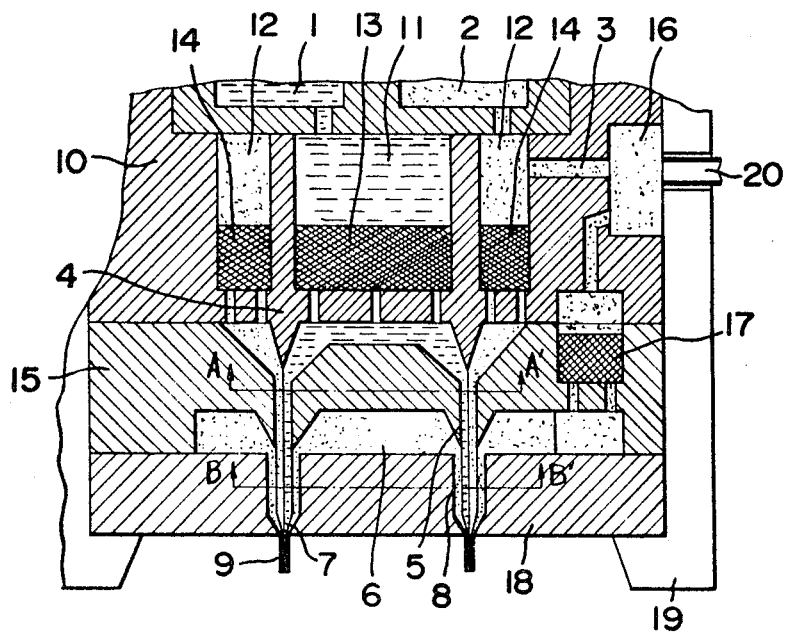
FIG. 5 is a vertical sectional view illustrating an example of the present apparatus.
Figure 6:
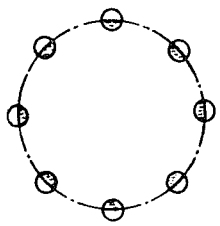
FIGS. 6 and 7 are sectional views taken along lines A–A' and B–B' of FIG. 5, respectively.
Figure 7:
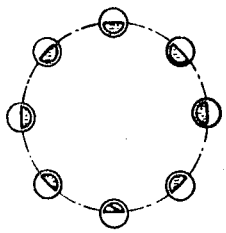

In FIG. 5 two components to be bonded together are indicated by 1 and 2. The two components 1 and 2, which have been separately molten or dissolved and fed in, are guided to a filter block 10. The filter block 10 consists of two chambers 11 and 12, the component 1 entering the inner chamber 11, the component 2 entering the outer chamber 12. The component 1 is filtered by a filter 13 and the component 2 is filtered by a filter 14. The two components are then bonded at the pointed end of the partition 4 and extruded through the guide hole projecting from the inner spinneret plate 15, into the solution reservoir 6. The solution reservoir 6 has been filled with the component 2 fed thereto through the solution feeding pipe 3 and metered and then passed through a filter 17 by a gear pump 16, so that the polymer extruded through the spinning guide hole 5 is surrounded by the component 2 and is passed through the guide hole 8 and extruded through the spinning hole 7 of the outer spinneret plate 18 to form a filament 9. 19 denotes a spinneret holding sleeve and 20 denotes a drive shaft for the gear pump 16. The solution feeding pipe 3 may not necessarily be located in the position as shown in FIG. 5 and may be so adapted as to cause the polymer 2 to branch off at a further forward position or, inversely, at the rear of the filter 14 (in that case, the filter 17 is unnecessary). Even if the gear pump 16 is omitted it is possible to obtain any desired value for the thickness of the component 2' forming the outer peripheral portion of the filament, provided that the solution feeding pipe and filter are properly designed. However, the use of such gear pump is advantageous, since it allows the accurate and optional control of the thickness. The partition 4 is cylindrical and the spinning guide holes 5 are arranged along the circumference thereof. FIG. 6 is a cross-sectional view taken along line A–A' of FIG. 5, illustrating the arrangement of the two-component polymer in the spinning guide holes. FIG. 7 is a cross-sectional view taken along line B–B' of FIG. 5, illustrating the arrangement of the two components in the guide holes 8. For the purpose of maintaining the correct shape of the polymer extruded through the spinning guide holes 5, the opening portions of the spinning guide holes may be protruded or, if necessary, made long enough to enter the guide holes 8. While the method and apparatus according to the present invention are adapted for melt spinning, they may be used also for dry spinning and wet spinning wherein the cross-section of filaments will change after the extrusion. While spinning holes and filaments obtained have been described with reference to those having a circular cross-section, it will be self-evident that the invention is applicable to those having irregular shapes.

As the thermoplastic synthetic polymers to be used in the invention, mention may be made of polyamide, polyester, polyester ether, polyurethane, polyurea, polysulfonamide, polyethylene, polyacrylonitrile, polypropylene, polyvinyl chloride, polyvinylidene chloride, and polyoxymethylene, their copolymers, graft polymers, and mixtures.

According to the method and apparatus of the present invention, there can be easily produced a filament wherein a core and sheath type cross-section with a high degree of eccentricity having an extremely uniform thin layer portion extends continuously along the longitudinal axis of the filament. Further, two kinds of polymers different in chemical and physical properties and having no mutual bonding property can be formed into a unitary filament by subjecting them to eccentric conjugate spinning, so that the obtained filament has a superior latent crimpability. Further, there can be provided an excellent self-crimpable filament wherein a polymer which in itself is poor in fibre-forming ability or which will involve sticking or other harmful phenomena when formed into fibres is placed in the core and a second polymer which is desirable for use as fibres is used for the sheath.

The following exampes are given in illustration of this invention and are not intended as limitations thereof.

EXAMPLE 1

The following polymers were conjugate spun, using the apparatus shown in FIG. 5.

Polymer 1

1 mol of caprolactam, 0.1 mol of hexamethylene diammonium isophthalate and 0.003 mol of acetic acid were mixed and polymerized in a nitrogen atmosphere at 250° C. for 6 hours, the intrinsic viscosity (as measured with m-cresol at 30° C., the definition being applied also to the following) being 0.86. This was copolyamide.

Polymer 2

1 mol of ε-caprolactam, 0.1 mol of aminocaproic acid and 0.003 mol of acetic acid were mixed and polymerized in a nitrogen atmosphere at 250° C. for 6 hours, the intrinsic viscosity being 0.98. This was nylon-6.

The polymers 1 and 2 were fed under pressure to the inner and outer chambers 11 and 12 at a solution feeding ratio of 4:5 by a gear pump, respectively, Further, the polymer 2 was fed under pressure from the feeding pipe 3 through the gear pump into the solution reservoir 6. The number of revolutions of the gear pump was so adjusted that the ratio between the quantity of polymer 1 fed to the chamber 11 and the quantity of polymer 2 fed to the solution reservoir 6 might be 4.1. The filament wound on a bobbin after being thus spun had a cross-sectional shape as shown in FIG. 1, with the polymer 1 serving as the core and the polymer 2 as the sheath, a fineness of the unitary filament being 80 deniers, the thickness of the thin layer portion being about 2.5% of the diameter. The filament on the bobbin was worked on a stretching machine. The stretching operation could be smoothly effected, with no phenomenon of sticking between filaments.

Then, the polymer 1, alone was subjected to melt spinning by usual practice, thus producing one component-filament which, after being wound on a bobbin, was worked on the stretching machine, whereupon frequent stretch irregularities and yarn breakage occurred due to the inter-fibre sticking phenomenon, so that it was impossible to effect satisfactory working.

EXAMPLE 2

Conjugate spinning was operated under the same conditions as in Example 1 except that the polymer 1 used was polyethylene oxybenzoate having an intrinsic viscosity of 0.53 (as measured with orthochlorophenol). The obtained composite filament had a fineness of the unitary filament of 75 deniers, which was composed of a filament having a cross-section as shown in FIG. 1 wherein the polyethylene oxybenzoate served as the core and nylon-6 as the sheath, the filament having an extremely uniform thin layer portion 2', there being observed no separation between the two components even after the subsequent treatments.

It is apparent that many variations may be made in the method and apparatus of the invention without departing from the spirit and scope thereof.

We claim:
1. A method of producing a composite filament having a core disposed eccentrically within a sheath which comprises bonding two fluid thermoplastic synthetic polymeric materials in a side-by-side relationship by extruding said materials through a single spinning guide hole in a spinneret to form a core and then spinning the resulting bonded two polymeric materials in a sheath and core filament by surrounding them with one of the two polymeric materials.

2. A method as claimed in claim 1, wherein the amounts of the two thermoplastic synthetic polymeric materials to be bonded in a side-by-side relationship are substantially equal.

3. A method as claimed in claim 1, wherein at least one of the two thermoplastic synthetic polymeric materials is a polycondensate selected from the group consisting of polyamides, polyesters, polyester-ethers, polyurethanes, polyureas, polysulfonamides, their copolymers and mixtures thereof.

4. A method as claimed in claim 1, wherein the two thermoplastic synthetic polymeric materials are (1) polycapramide, and (2) copolyamides consisting of polycapramide and polyhexamethyleneisophthalamide.

5. A method as claimed in claim 1, wherein at least one of the two thermoplastic synthetic polymeric materials is an addition polymer selected from the group consisting of polyethylenes, polypropylenes, polyacrylonitriles, polyvinyl chlorides, polyvinylidene chlorides, their copolymers and mixtures thereof.

6. A method as claimed in claim 1, wherein the two thermoplastic synthetic polymeric materials are polymers which have no mutual adhering property.

7. A method as claimed in claim 1, wherein the sheath material is a fiber-forming polymer and the other material is a polymer having poor fibre formability.

8. A spinneret for producing a composite filament having a core disposed eccentrically within a sheath, which comprises an outer spinneret plate provided with at least one spinning hole, an inner spinneret plate provided with an equal number of spinning guide holes, a solution reservoir between said two spinneret plates, the outer spinneret plate and the inner spinneret plate being on opposite sides of the solution reservoir each spinning hole and the corresponding spinning guide hole axially aligned, means for feeding two fluid spinning solutions separately to the said common spinning guide hole and means for feeding a spinning solution to the said solution reservoir.

9. A spinneret as claimed in claim 8, wherein the means for feeding two spinning solutions separately to the spinning guide holes is a filter block provided with a partition forming two chambers on the inlet side of the inner spinneret plate and extending approximately to the centre of the inlet of the spinning guide hole on the inner spinneret plate, filters and guide holes in said chambers for feeding two spinning solutions separately from each chamber into the said guide hole adjacent the end of said partition.

10. A spinneret as claimed in claim 9, wherein the means for feeding a spinning solution into the solution reservoir is a pipe connecting one of the two chambers with the solution reservoir.

11. A spinneret as claimed in claim 9, wherein the means for feeding a spinning solution to the solution reservoir comprises a solution feeding pipe for withdrawing spinning solution directly from one of the chambers ahead of its associated filter, a metering pump, an additional filter and a pipe connecting to the solution reservoir.

12. A spinneret as claimed in claim 8, wherein the discharge portion of the spinning guide hole in the inner spinneret plate projects into the solution reservoir.

13. A spinneret as claimed in claim 12, wherein the discharge portion of the spinning guide hole extends substantially into the guide hole of the outer spinneret plate.

14. A spinneret as claimed in claim 8, wherein the cross sectional shape of the spinning guide hole and the corresponding spinning hole is noncircular.

15. A spinneret as claimed in claim 8 wherein each plate is provided with a plurality of spinning holes arranged in a circle on said plate.

16. A method as claimed in claim 1 wherein the spinning is effected by extruding the core together with a further amount of one of said polymers.

References Cited

UNITED STATES PATENTS

| | | |
|---|---|---|
| 2,815,532 | 12/1957 | Brannlich. |
| 2,932,079 | 4/1960 | Dietzsch et al. |
| 3,075,241 | 1/1963 | Dietzsch et al. |
| 3,197,812 | 8/1965 | Dietzsch et al. |
| 3,244,785 | 4/1966 | Hollandsworth _____ 264—171 |
| 3,315,021 | 4/1967 | Luzzato |
| 3,341,891 | 9/1967 | Simizu et al. |
| 3,375,548 | 4/1968 | Kido et al. |

JULIUS FROME, Primary Examiner

J. H. WOO, Assistant Examiner

U.S. Cl. X.R.

18—8; 264—168